US012603430B2

(12) United States Patent
Su et al.

(10) Patent No.: US 12,603,430 B2
(45) Date of Patent: Apr. 14, 2026

(54) ANTENNA STRUCTURE AND MOBILE DEVICE

(71) Applicant: Wistron NeWeb Corp., Hsinchu (TW)

(72) Inventors: Guan-Ren Su, Hsinchu (TW); Meng-Kai Wu, Hsinchu (TW); Hsieh-Chih Lin, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 318 days.

(21) Appl. No.: 18/451,391

(22) Filed: Aug. 17, 2023

(65) Prior Publication Data

US 2024/0088562 A1 Mar. 14, 2024

(30) Foreign Application Priority Data

Sep. 14, 2022 (TW) ................................. 111134673

(51) Int. Cl.
*H01Q 5/328* (2015.01)
*H01Q 9/04* (2006.01)

(52) U.S. Cl.
CPC ........... *H01Q 5/328* (2015.01); *H01Q 9/0442* (2013.01)

(58) Field of Classification Search
CPC ........ H01Q 5/328; H01Q 9/0442; H01Q 5/25; H01Q 5/371; H01Q 1/243; H01Q 5/378; H01Q 9/42
See application file for complete search history.

(56) References Cited

U.S. PATENT DOCUMENTS

2015/0145744 A1* 5/2015 Kao ......................... H01Q 9/42 343/852
2019/0123423 A1* 4/2019 Wu ........................ H01Q 1/243
2019/0198975 A1* 6/2019 Chen ........................ H01Q 9/42
2020/0106177 A1* 4/2020 Zhou ...................... H01Q 5/378
2021/0175631 A1* 6/2021 Wu ........................ H01Q 13/16
2021/0351509 A1 11/2021 Lin et al.
2022/0069473 A1* 3/2022 Lai ......................... H01Q 5/357
2022/0102852 A1* 3/2022 Irci ........................ H01Q 1/243
2022/0131267 A1 4/2022 Chen et al.
(Continued)

FOREIGN PATENT DOCUMENTS

CN 113285212 A 8/2021
TW 202143554 A 11/2021
TW 202218240 A 5/2022

*Primary Examiner* — Dimary S Lopez Cruz
*Assistant Examiner* — Michael M Bouizza
(74) *Attorney, Agent, or Firm* — McClure, Qualey & Rodack, LLP

(57) ABSTRACT

An antenna structure includes a metal mechanism element, a feeding radiation element, a first radiation element, a second radiation element, a third radiation element, a fourth radiation element, a fifth radiation element, a sixth radiation element, and a tuning circuit. A slot is formed in the metal mechanism element. The first radiation element is coupled to the feeding radiation element. The tuning circuit is coupled to the first radiation element. The second radiation element is coupled to the feeding radiation element. The third radiation element is coupled to a first grounding point on the metal mechanism element. The fourth radiation element is coupled to a second grounding point on the metal mechanism element. The fifth radiation element is coupled to a third grounding point on the metal mechanism element.

20 Claims, 4 Drawing Sheets

(56) References Cited

U.S. PATENT DOCUMENTS

| | | | | |
|---|---|---|---|---|
| 2023/0006332 | A1* | 1/2023 | Chang | H01Q 21/064 |
| 2023/0198149 | A1* | 6/2023 | Wei | H01Q 5/364<br>343/702 |

* cited by examiner

ANTENNA STRUCTURE AND MOBILE DEVICE

CROSS REFERENCE TO RELATED APPLICATIONS

This application claims priority of Taiwan Patent Application No. 111134673 filed on Sep. 14, 2022, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. Accordingly, it has become a critical challenge for antenna designers to design a small-size, wideband antenna structure.

BRIEF SUMMARY OF THE INVENTION

In an exemplary embodiment, the invention is directed to an antenna structure that includes a metal mechanism element, a feeding radiation element, a first radiation element, a second radiation element, a third radiation element, a fourth radiation element, a fifth radiation element, a sixth radiation element, and a tuning circuit. A slot is formed in the metal mechanism element. The feeding radiation element has a feeding point. The first radiation element is coupled to the feeding radiation element. The tuning circuit is coupled to the first radiation element. The second radiation element is coupled to the feeding radiation element. The feeding radiation element is positioned between the first radiation element and the second radiation element. The third radiation element is coupled to a first grounding point on the metal mechanism element. The fourth radiation element is coupled to a second grounding point on the metal mechanism element. The fifth radiation element is coupled to a third grounding point on the metal mechanism element. The sixth radiation element is coupled to the feeding radiation element. The feeding radiation element, the first radiation element, the second radiation element, the third radiation element, the fourth radiation element, the fifth radiation element, and the sixth radiation element are all disposed inside the slot of the metal mechanism element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
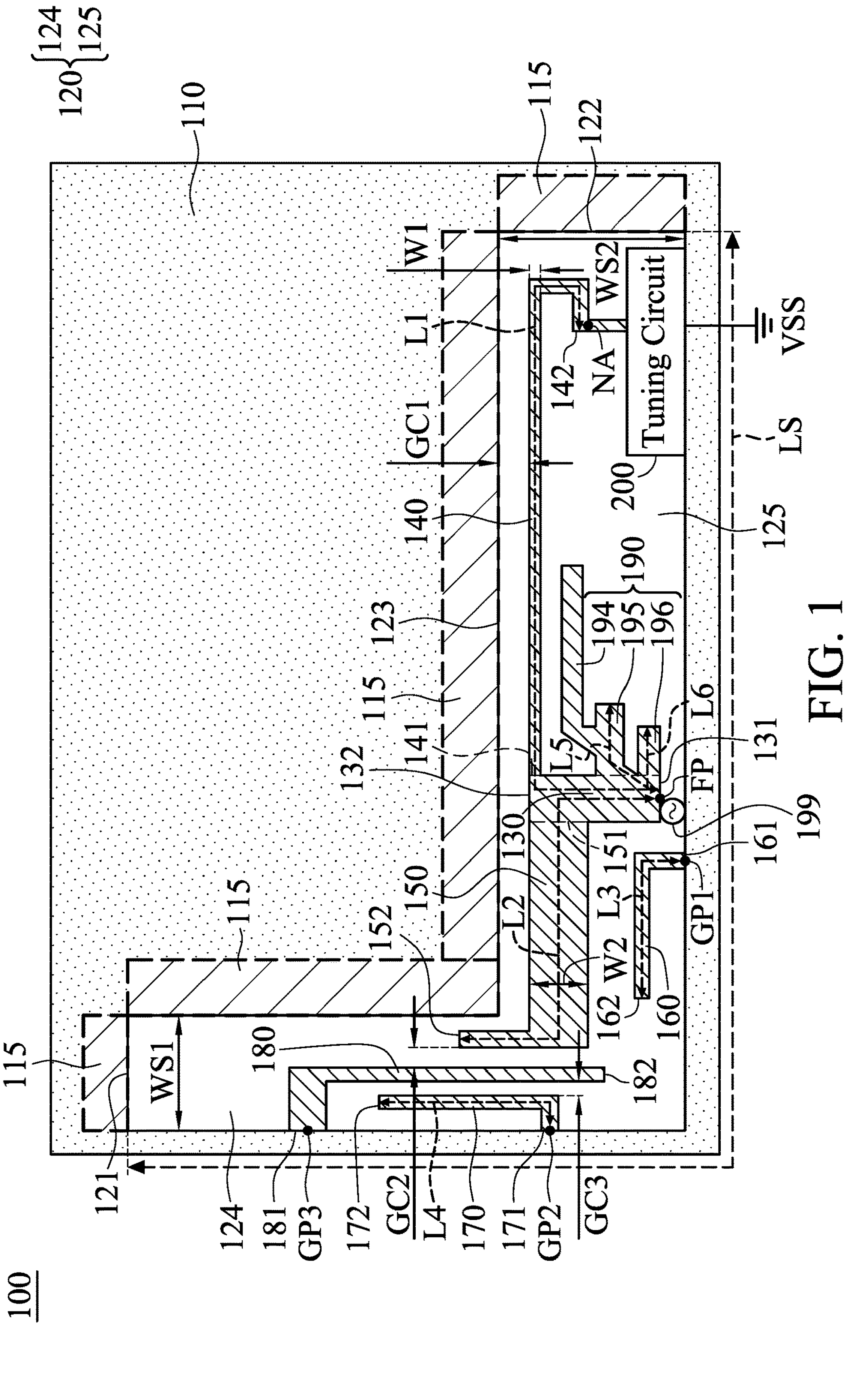
FIG. 1 is a top view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of an antenna structure 100 according to an embodiment of the invention. The antenna structure 100 may be applied to a mobile device, such as a smart phone, a tablet computer, or a notebook computer. As shown in FIG. 1, the antenna structure 100 includes a metal mechanism element 110, a feeding radiation element 130, a first radiation element 140, a second radiation element 150, a third radiation element 160, a fourth radiation element 170, a fifth radiation element 180, a sixth radiation element 190, and a tuning circuit 200. The feeding radiation element 130, the first radiation element 140, the second radiation element 150, the third radiation element 160, the fourth radiation element 170, the fifth radiation element 180, and the sixth radiation element 190 may all be made of metal materials, such as copper, silver, aluminum, iron, or their alloys.

The metal mechanism element 110 may be a metal plate. For example, if the antenna structure 100 is applied in a notebook computer, the metal mechanism element 110 may be integrated with a keyboard frame or a base housing of the notebook computer. The keyboard frame and the base housing are equivalent to the so-called "C-component" and "D-component" in the field of notebook computers, respectively.

In addition, a slot 120 is formed in the metal mechanism element 110. For example, the slot 120 of the metal mechanism element 110 may be an L-shaped closed slot with a first closed end 121 and a second closed end 122. In some embodiments, the slot 120 of the metal mechanism element 110 includes a narrow portion 124 adjacent to the first closed end 121 and a wide portion 125 adjacent to the second closed end 122. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0). It should be noted that the feeding radiation element 130, the first radiation element 140, the second radiation element 150, the third radiation element 160, the fourth radiation element 170, the fifth radiation element 180, and the sixth radiation element 190 (or their vertical projections) are all disposed inside the slot 120 of the metal mechanism element 110.

The feeding radiation element 130 has a first end 131 and a second end 132. A feeding point FP is positioned at the first end 131 of the feeding radiation element 130. The feeding point FP may be further coupled to a signal source 199. For example, the signal source 199 may be an RF (Radio Frequency) module for exciting the antenna structure 100. In some embodiments, the feeding radiation element 130 may substantially have a straight-line shape.

The first radiation element 140 has a first end 141 and a second end 142. The first end 141 of the first radiation element 140 is coupled to the second end 132 of the feeding radiation element 130. A tuning point NA is positioned at the second end 142 of the first radiation element 140. In addition, the tuning circuit 200 is coupled to the tuning point NA, and it is configured to fine-tune the impedance matching of the antenna structure 100. In some embodiments, the first radiation element 140 may substantially have a meandering shape, such as a U-shape or a J-shape.

The feeding radiation element 130 is positioned between the first radiation element 140 and the second radiation element 150. Specifically, the second radiation element 150 has a first end 151 and a second end 152. The first end 151 of the second radiation element 150 is coupled to the second end 132 of the feeding radiation element 130. The second end 152 of the second radiation element 150 is an open end. In some embodiments, a first coupling gap GC1 is formed between an edge 123 of the metal mechanism element 110 and each of the first radiation element 140 and the second radiation element 150. In some embodiments, the second radiation element 150 may substantially have an L-shape. The width W2 of the second radiation element 150 is greater than the width W1 of the first radiation element 140.

The third radiation element 160 may be at least partially surrounded by the feeding radiation element 130 and the second radiation element 150. Specifically, the third radiation element 160 has a first end 161 and a second end 162. The first end 161 of the third radiation element 160 is coupled to a first grounding point GP1 on the metal mechanism element 110. The second end 162 of the third radiation element 160 is an open end. For example, the second end 142 of the first radiation element 140 and the second end 162 of the third radiation element 160 may substantially extend in the same direction. In some embodiments, the third radiation element 160 may substantially have an L-shape.

The fourth radiation element 170 may be at least partially surrounded by the fifth radiation element 180. Specifically, the fourth radiation element 170 has a first end 171 and a second end 172. The first end 171 of the fourth radiation element 170 is coupled to a second grounding point GP2 on the metal mechanism element 110. The second end 172 of the fourth radiation element 170 is an open end. In some embodiments, the fourth radiation element 170 may substantially have an L-shape.

The fifth radiation element 180 may extend between the second radiation element 150 and the fourth radiation element 170. Specifically, the fifth radiation element 180 has a first end 181 and a second end 182. The first end 181 of the fifth radiation element 180 is coupled to a third grounding point GP3 on the metal mechanism element 110. The second end 182 of the fifth radiation element 180 is an open end. For example, the second end 172 of the fourth radiation element 170 and the second end 182 of the fifth radiation element 180 may substantially extend in opposite directions and away from each other. In some embodiments, the fifth radiation element 180 may substantially have an L-shape. The first grounding point GP1, the second grounding point GP2, and the third grounding point GP3 may be different from each other. In some embodiments, a second coupling gap GC2 is formed between the second radiation element 150 and the fifth radiation element 180, and a third coupling gap GC3 is formed between the fourth radiation element 170 and the fifth radiation element 180.

The sixth radiation element 190 is coupled to the feeding radiation element 130. The sixth radiation element 190 includes a first branch 194, a second branch 195, and a third branch 196. For example, the first branch 194, the second branch 195, and the third branch 196 may be substantially parallel to each other, and they may extend in the same direction. In some embodiments, the second radiation element 150 is positioned at a side (e.g., the left side) of the feeding radiation element 130, and the first radiation element 140 and the sixth radiation element 190 are both positioned at the opposite side (e.g., the right side) of the feeding radiation element 130. In some embodiments, the sixth radiation element 190 may substantially have a W-shape.

In some embodiments, the antenna structure 100 further includes a metal wall 115. The metal wall 115 is disposed along the edge 123 of the slot 120 of the metal mechanism element 110. According to practical measurements, the incorporation of the metal wall 115 can guarantee the antenna structure 100 using an independent clearance region, and it can also reduce interference between the antenna structure 100 and the other electronic components of the corresponding mobile device. It should be understood that the metal wall 115 is an optional component, which is omitted in other embodiments.

Figure 2:
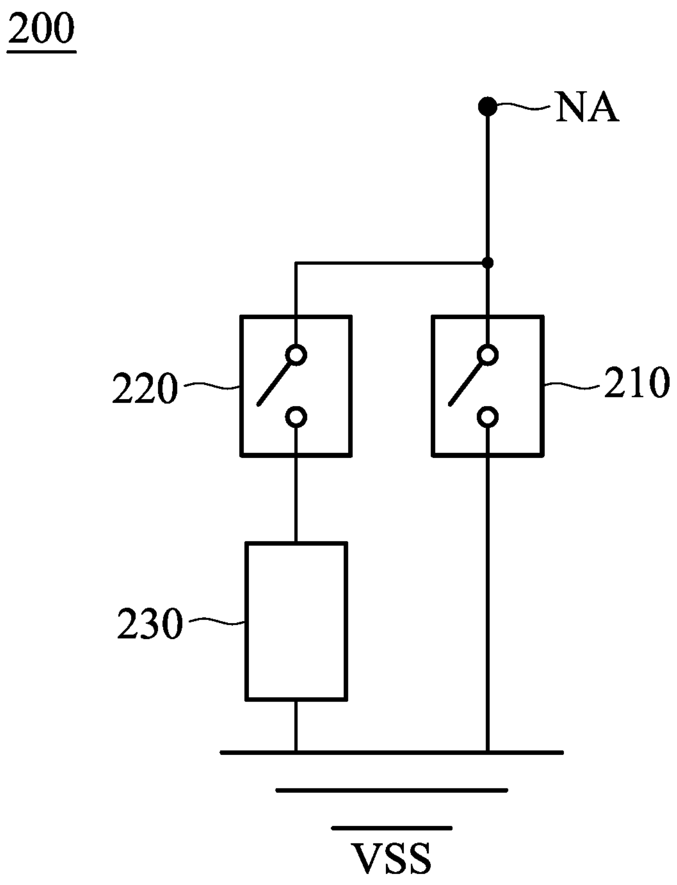
FIG. 2 is a diagram of circuitry of a tuning circuit according to an embodiment of the invention.

FIG. 2 is a diagram of circuitry of the tuning circuit 200 according to an embodiment of the invention. In the embodiment of FIG. 2, the tuning circuit 200 includes a first switch element 210, a second switch element 220, and an inductor 230. The first switch element 210 has a first terminal coupled to a tuning point NA on the first radiation element 140, and a second terminal coupled to a ground voltage VSS. For example, the ground voltage VSS may be provided by the aforementioned metal mechanism element 110. The second switch element 220 has a first terminal coupled to the tuning point NA, and a second terminal coupled through the inductor 230 to the ground voltage VSS. However, the invention is not limited thereto. In alternative embodiments, the tuning circuit 200 may have a different circuitry in order to meet design requirements.

Figure 3:
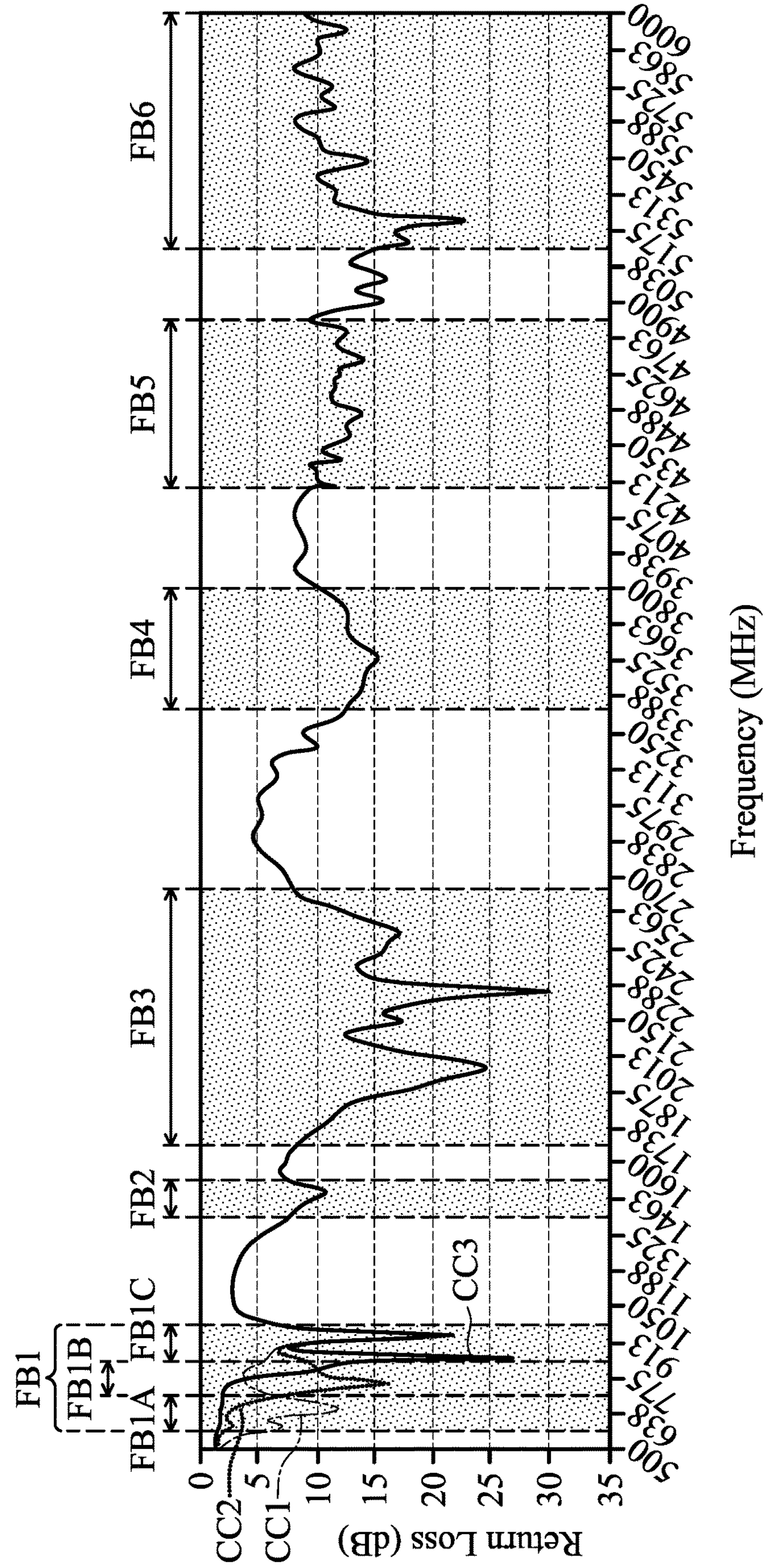
FIG. 3 is a diagram of return loss of an antenna structure according to an embodiment of the invention.

FIG. 3 is a diagram of return loss of the antenna structure 100 according to an embodiment of the invention. The horizontal axis represents the operational frequency (MHz), and the vertical axis represents the return loss (dB). According to the measurement of FIG. 3, the antenna structure 100 can cover a first frequency band FB1, a second frequency band FB2, a third frequency band FB3, a fourth frequency band FB4, a fifth frequency band FB5, and a sixth frequency band FB6. For example, the first frequency band FB1 may be from 617 MHz to 960 MHz, the second frequency band FB2 may be from 1400 MHz to 1500 MHz, the third frequency band FB3 may be from 1710 MHz to 2690 MHz, the fourth frequency band FB4 may be from 3300 MHz to 3800 MHz, the fifth frequency band FB5 may be from 4200 MHz to 4800 MHz, and the sixth frequency band FB6 may be from 5100 MHz to 6000 MHz. Therefore, the antenna structure 100 can support at least the sub-6 GHz wideband operations of and the next 5G (5th Generation Wireless System) communication.

In some embodiments, the operational principles of the antenna structure 100 will be described as follows. The first frequency band FB1 is divided into a first frequency interval FB1A, a second frequency interval FB1B, and a third frequency interval FB1C. The first frequency interval FB1A may be from 617 MHz to 690 MHz. The second frequency interval FB1B may be from 690 MHz to 815 MHz. The third frequency interval FB1C may be from 815 MHz to 960 MHz. If the first switch element 210 is open and the second switch element 220 is closed, the antenna structure 100 will support the first frequency interval FB1A, and its operational characteristics will be shown by a first curve CC1 of FIG. 3. If the first switch element 210 is closed and the second switch element 220 is open, the antenna structure 100 will support the second frequency interval FB1B, and its operational characteristics will be shown by a second curve CC2 of FIG. 3. If the first switch element 210 and the second switch element 220 are both open, the antenna structure 100 will support the third frequency interval FB1C, and its operational characteristics will be shown by a third curve CC3 of FIG. 3. Therefore, the antenna structure 100 can completely cover the desired operational bandwidth by using the tuning circuit 200, especially for the relatively-low first frequency band FB1.

In addition, the feeding radiation element 130, the first radiation element 140, the second radiation element 150, the third radiation element 160, the fourth radiation element 170, the fifth radiation element 180, and the sixth radiation element 190 are further excited to generate the second frequency band FB2, the third frequency band FB3, the fourth frequency band FB4, the fifth frequency band FB5, and the sixth frequency band FB6. According to practical measurements, the incorporation of the fifth radiation element 180 can help to improve the relatively-low frequency shift of the antenna structure 100. Also, the first branch 194 of the sixth radiation element 190 can fine-tune the relatively-high frequency impedance matching of the antenna structure 100.

Furthermore, the whole size of the antenna structure 100 can be further minimized since the feeding radiation element 130, the first radiation element 140, the second radiation element 150, the third radiation element 160, the fourth radiation element 170, the fifth radiation element 180, and the sixth radiation element 190 are all disposed inside the slot 120 of the metal mechanism element 110. That is, the antenna structure 100 has at least the advantages of both small size and wide bandwidth.

In some embodiments, the element sizes and parameters of the antenna structure 100 will be described as follows. The length LS of the slot 120 of the metal mechanism element 110 may be substantially equal to 1 wavelength (1*k*) of the first frequency band FB1 of the antenna structure 100. The width WS1 of the narrow portion 124 of the slot 120 may be from 10 mm to 14 mm. The width WS2 of the wide portion 125 of the slot 120 may be from 14 mm to 18 mm. The total length L1 of the feeding radiation element 130 and the first radiation element 140 may be substantially equal to 0.5 wavelength (λ/2) of the first frequency band FB1 of the antenna structure 100. The total length L2 of the feeding radiation element 130 and the second radiation element 150 may be substantially equal to 0.5 wavelength (λ/2) of the third frequency band FB3 of the antenna structure 100. The length L3 of the third radiation element 160 may be substantially equal to 0.5 wavelength (λ/2) of the fourth frequency band FB4 of the antenna structure 100. The length L4 of the fourth radiation element 170 may be substantially equal to 0.5 wavelength (λ/2) of the second frequency band FB2 of the antenna structure 100. In the sixth radiation element 190, the length L5 of the second branch 195 may be substantially equal to 0.5 wavelength (λ/2) of the fifth frequency band FB5 of the antenna structure 100, and the length L6 of the third branch 196 may be substantially equal to 0.5 wavelength (λ/2) of the sixth frequency band FB6 of the antenna structure 100. The width of the first coupling gap GC1 may be greater than 0 mm and less than or equal to 10 mm. The width of the second coupling gap GC2 may be from 0.1 mm to 1 mm. The width of the third coupling gap GC3 may be from 0.1 mm to 1 mm. The inductance of the inductor 230 may be from 8 nH to 16 nH, such as 12 nH. The above ranges of element sizes and parameters are calculated and obtained according to many experiment results, and they help to optimize the operational bandwidth and impedance matching of the antenna structure 100.

Figure 4:
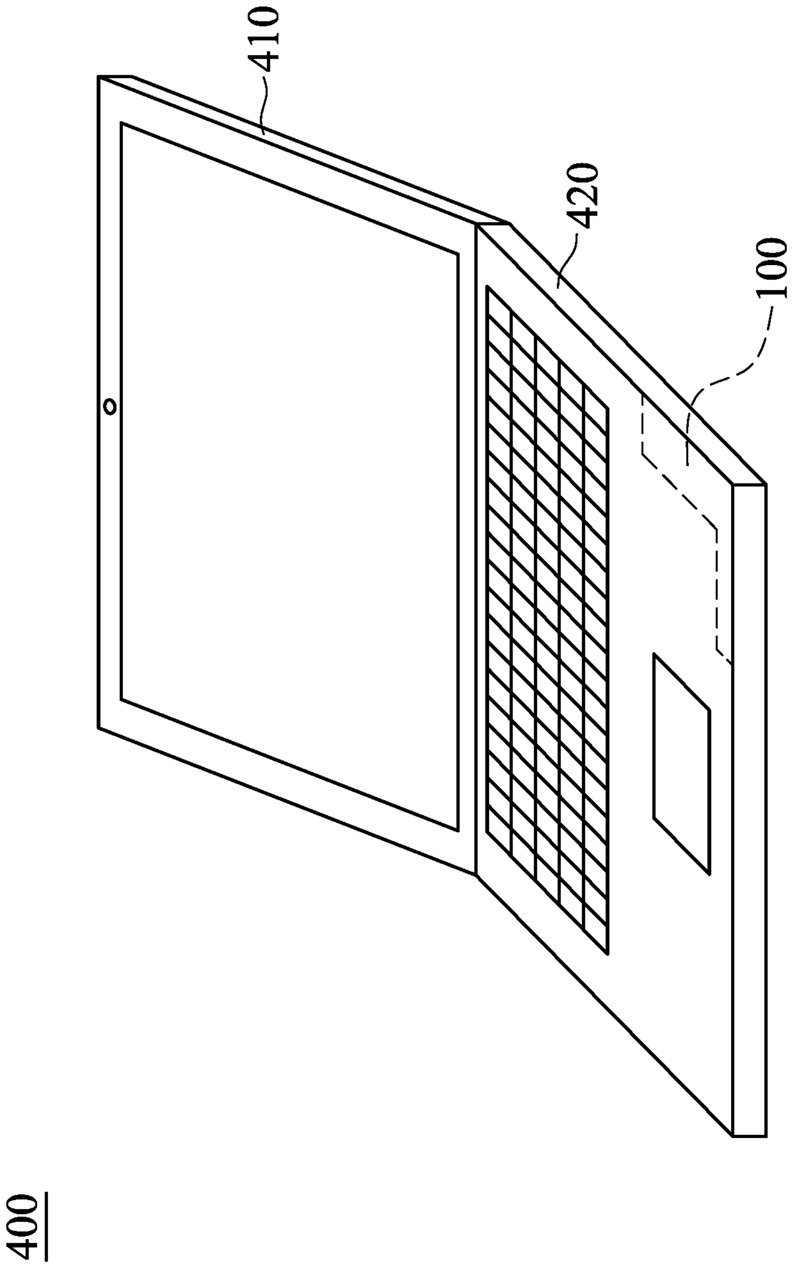
FIG. 4 is a perspective view of a mobile device according to an embodiment of the invention.

FIG. 4 is a perspective view of a mobile device 400 according to an embodiment of the invention. In the embodiment of FIG. 4, the mobile device 400 is a notebook computer, which includes an upper cover element 410, a base element 420, and the aforementioned antenna structure 100. The base element 420 is connected to the upper cover element 410. The aforementioned antenna structure 100 is formed at any corner of the base element 420. In addition, there may be an antenna window opened on the base element 420, so as to help the aforementioned antenna structure 100 to transmit or receive signals of electromagnetic waves. Other features of the mobile device 400 of FIG. 4 are similar to those of the antenna structure 100 of FIG. 1. Accordingly, the two embodiments can achieve similar levels of performance.

The invention proposes a novel antenna structure and a corresponding mobile device. In comparison to the conventional design, the invention has at least the advantages of smaller size, wider bandwidth, lower complexity, and lower manufacturing cost. Therefore, the invention is suitable for application in a variety of communication devices.

Note that the above element sizes, element shapes, and frequency ranges are not limitations of the invention. An antenna designer can fine-tune these settings or values in order to meet specific requirements. It should be understood that the antenna structure and the mobile device of the invention are not limited to the configurations depicted in FIGS. 1-4. The invention may merely include any one or more features of any one or more embodiments of FIGS. 1-4. In other words, not all of the features displayed in the figures should be implemented in the antenna structure and the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a metal mechanism element, wherein a slot is formed in the metal mechanism element;

a feeding radiation element, having a feeding point;

a first radiation element, coupled to the feeding radiation element;

a tuning circuit, coupled to the first radiation element;

a second radiation element, coupled to the feeding radiation element, wherein the feeding radiation element is positioned between the first radiation element and the second radiation element;

a third radiation element, coupled to a first grounding point on the metal mechanism;

a fourth radiation element, coupled to a second grounding point on the metal mechanism;

a fifth radiation element, coupled to a third grounding point on the metal mechanism; and a sixth radiation element, coupled to the feeding radiation element;

wherein the feeding radiation element, the first radiation element, the second radiation element, the third radiation element, the fourth radiation element, the fifth radiation element, and the sixth radiation element are disposed inside the slot of the metal mechanism element.

2. The antenna structure as claimed in claim 1, wherein the antenna structure covers a first frequency band, a second frequency band, a third frequency band, a fourth frequency band, a fifth frequency band, and a sixth frequency band.

3. The antenna structure as claimed in claim 2, wherein the first frequency band is from 617 MHz to 960 MHz, the second frequency band is from 1400 MHz to 1500 MHz, the third frequency band is from 1710 MHz to 2690 MHz, the fourth frequency band is from 3300 MHz to 3800 MHz, the fifth frequency band is from 4200 MHz to 4800 MHz, and the sixth frequency band is from 5100 MHz to 6000 MHz.

4. The antenna structure as claimed in claim 2, wherein the first frequency band is divided into a first frequency interval, a second frequency interval, and a third frequency interval, the first frequency interval is from 617 MHz to 690 MHz, the second frequency interval is from 690 MHz to 815 MHz, and the third frequency interval is from 815 MHz to 960 MHz.

5. The antenna structure as claimed in claim 4, wherein the tuning circuit comprises:

a first switch element, wherein the first switch element has a first terminal coupled to a tuning point on the first radiation element, and a second terminal coupled to a ground voltage; and an inductor; and a second switch element, wherein the second switch element has a first terminal coupled to the tuning point, and a second terminal coupled through the inductor to the ground voltage.

6. The antenna structure as claimed in claim 5, wherein:

if the first switch element is open and the second switch element is closed, the antenna structure supports the first frequency interval;

if the first switch element is closed and the second switch element is open, the antenna structure supports the second frequency interval; and if the first switch element and the second switch element are open, the antenna structure supports the third frequency interval.

7. The antenna structure as claimed in claim 2, wherein the slot of the metal mechanism element is an L-shaped closed slot comprising a narrow portion and a wide portion.

8. The antenna structure as claimed in claim 2, wherein a length of the slot of the metal mechanism element is substantially equal to 1 wavelength of the first frequency band.

9. The antenna structure as claimed in claim 2, wherein a total length of the feeding radiation element and the first radiation element is substantially equal to 0.5 wavelength of the first frequency band.

10. The antenna structure as claimed in claim 2, wherein a total length of the feeding radiation element and the second radiation element is substantially equal to 0.5 wavelength of the third frequency band.

11. The antenna structure as claimed in claim 2, wherein a length of the third radiation element is substantially equal to 0.5 wavelength of the fourth frequency band.

12. The antenna structure as claimed in claim 2, wherein a length of the fourth radiation element is substantially equal to 0.5 wavelength of the second frequency band.

13. The antenna structure as claimed in claim 2, wherein the sixth radiation element substantially has a W-shape and comprises a first branch, a second branch, and a third branch.

14. The antenna structure as claimed in claim 13, wherein a length of the second branch is substantially equal to 0.5 wavelength of the fifth frequency band, and a length of the third branch is substantially equal to 0.5 wavelength of the sixth frequency band.

15. The antenna structure as claimed in claim 1, wherein each of the second radiation element, the third radiation element, the fourth radiation element, and the fifth radiation element substantially has an L-shape.

16. The antenna structure as claimed in claim 1, wherein a width of the second radiation element is greater than that of the first radiation element.

17. The antenna structure as claimed in claim 1, wherein the fourth radiation element is at least partially surrounded by the fifth radiation element, and the fifth radiation element extends between the second radiation element and the fourth radiation element.

18. The antenna structure as claimed in claim 1, wherein a first coupling gap is formed between an edge of the metal mechanism element and each of the first radiation element and the second radiation element, a second coupling gap is formed between the second radiation element and the fifth radiation element, and a third coupling gap is formed between the fourth radiation element and the fifth radiation element.

19. The antenna structure as claimed in claim 1, further comprising:

a metal wall, disposed along the slot of the metal mechanism element.

20. A mobile device, comprising:

an upper cover element;

a base element, connected to the upper cover element; and an antenna structure as claimed in claim 1, formed at a corner of the base element.

* * * * *